UNITED STATES PATENT OFFICE 2,293,551

ESTERS OF ALIPHATIC ACIDS WITH ISOPROPYL ALCOHOL

Eric C. Kunz, Montclair, and Max Luthy, Ridgewood, N. J.

No Drawing. Application July 14, 1938, Serial No. 219,206

1 Claim. (Cl. 167—65)

This invention relates to the preparation of esters of aliphatic acids and isopropyl alcohol which are new compositions of matter suitable as solvents or dispersing agents for medicaments and perfumes, flavors, etc. and have improved advantages for such uses as compared with vegetable, mineral and animal oils or fats.

Esters of fatty acids and the lower aliphatic alcohols such as methanol, ethanol, amyl alcohol are well known substances which, however, have barely any practical use as solvents or dispersing agents for medicaments and the like since these esters all have a characteristic odor and taste. We have now discovered that certain aliphatic or fatty acid esters in which the aliphatic acid is esterified with isopropyl alcohol, and which are entirely new compounds, have the surprising and unexpected quality of being practically tasteless and odorless. Such combination product of aliphatic acids and isopropyl alcohol is furthermore very valuable because both substances are nontoxic and are easily assimilated by the human and animal system without any disadvantageous effect. These isopropyl esters of aliphatic or fatty acids have the added advantage of being liquid at room temperature and mixtures of various isopropyl esters stay liquid even when cooled to temperatures as low as $-10°$ C. The combinations of isopropyl esters of aliphatic acids including the fatty acids of 12–16 carbon atoms, such as lauric, myristic and palmitic acid in the various proportions as they occur in the vegetable oils such as coconut oil, palm kernel oil and palm oil, and in animal wax such as spermaceti wax, and in vegetable wax such as myrtle wax and Japan wax are the ones which we have found peculiarly well suited for the purposes of our invention.

As examples of pure or unmixed isopropyl esters of the various aliphatic or fatty acids which fall within the scope of our invention we may mention isopropyl laurate, myristate and palmitate. These pure substances have physical constants as follows:

|  | Boiling point @5 mm. Hg | Melting point | Sp. gr. 25° |
|---|---|---|---|
| Isopropyl laurate | 120–122° C | Liquid | .8523 |
| Isopropyl myristate | 141–143° C | 7.5° C | .8522 |
| Isopropyl palmitate | 163–165° C | 13° C | .8522 |

Either the esters themselves or mixtures of these esters may have the valuable properties described above. These esters are easily obtained from oils by isopropyl alcoholysis or from the mixture of the fatty acids obtained on saponification of the oils. They are particularly easy to refine by known methods as e. g., by distillation during which the esters of the fatty acids with not less than 12 carbon atoms and not more than 16 carbon atoms are readily separated. The isopropyl esters of aliphatic acids having less than 12 carbon atoms have a distinct odor and taste and cannot be used for purposes requiring an odorless and tasteless product, while the isopropyl esters of aliphatic acids containing more than 16 carbon atoms have the disadvantage of being solid at ordinary temperature ranges and are therefore not suited to our purpose.

It is well known that it is extremely difficult to find a non-toxic product for the purpose described above which is at the same time a suitable solvent for perfume oils, mineral oils, medicinal preparations such as vitamins, etc., having no taste and no odor and not subject to the usual deterioration such as rancidity which commonly occurs in the various vegetable oils, such as olive oil, etc., and which does not congeal under ordinary household temperatures and conditions. We have made extensive tests on various animals and have found our new product to be non-toxic in addition to possessing all of the other advantages enumerated above.

Our new product is useful in connection with cosmetic and toilet preparations in general. We have made exhaustive tests of its suitability for this purpose with highly satisfactory results, in creams, lotions, lipsticks, hair tonics, etc. It is particularly suited to replace mineral oils, for example in such hair tonics as "brilliantines." Everyone is familiar with the drying effect of gasoline when spilled over the hand: the hand feels extremely dry after the gasoline has evaporated because it has extracted from the skin its lubricants, the natural human fats. The same effect occurs when mineral oil is used on the skin, but it is not so noticeable because the mineral oil feels fatty on the skin since it does not evaporate although it actually has the same effect as gasoline in extracting the natural fats of the skin.

Creams, particularly the modern cleansing or vanishing creams, have heretofore been based on such mineral oils as white oils and vaselines, which may be substituted wholly or in part with our odorless and tasteless non-toxic fatty acid esters. The difficulty of finding suitable solvents for this and related purposes is demonstrated by the fact that suggestions have even recently been made by chemical manufacturers skilled in the art to use ethylene glycol as a solvent or carrier for vitamins, although the toxic effects of diethylene glycol are well known in connection with their attempted use as a solvent for sulphanilamid. Such vegetable oils as highly refined olive oil, when used for the same purpose, become rancid very quickly. On the other hand, our fatty acid esters, which are water-white, and are comparatively inexpensive and available in unlimited quantities, show no appreciable deterioration over long periods of time.

Accordingly, it is to be understood that the terms "medicament" and "medicinal preparation" employed herein are intended as terms of general description, not of limitation, and include the full range of pharmaceutical and medicinal preparations whether or not they are used for the relief or cure of sickness.

This application is a continuation-in-part of applicants' copending application, Serial No. 82,928, filed June 1, 1936.

Also, while only a few of the many possible embodiments of our invention have been set forth, it will be evident that the invention is not to be restricted thereto but is only to be limited in accordance with the following claim when interpreted in view of the prior art.

The invention claimed is:

A product from the class consisting of medicaments, perfumes, and flavors, having as its carrier at least one isopropyl ester of a 12–16 carbon atom, normal, saturated, aliphatic acid, said ester boiling between 120° C. and 165° C. at 5 mm. mercury pressure and being characterized by being a substantially non-toxic, odorless, tasteless, water-white liquid at normal room temperatures.

ERIC C. KUNZ.
MAX LUTHY.